L. C. A. VANDENHEUVEL.
LATHE.
APPLICATION FILED MAR. 26, 1918.
1,287,144.
Patented Dec. 10, 1918.
2 SHEETS—SHEET 1.
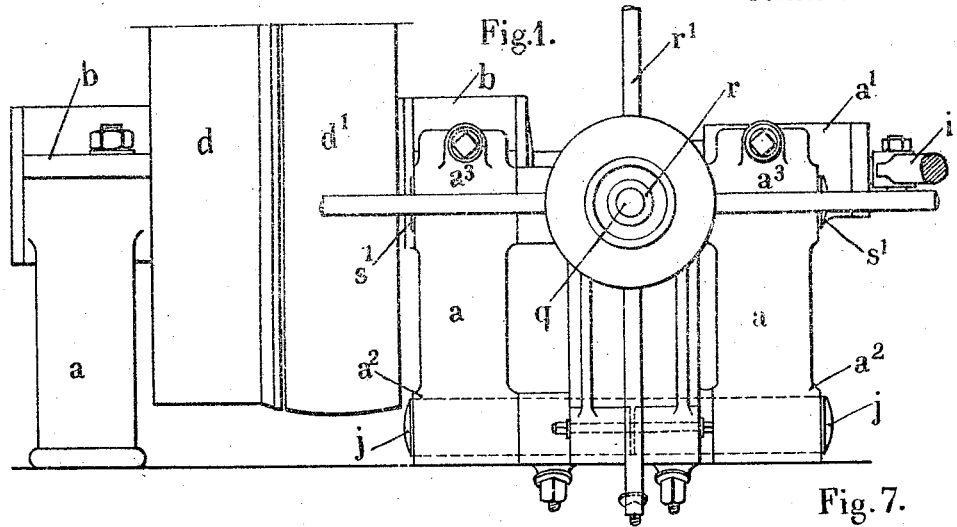
Fig. 1.
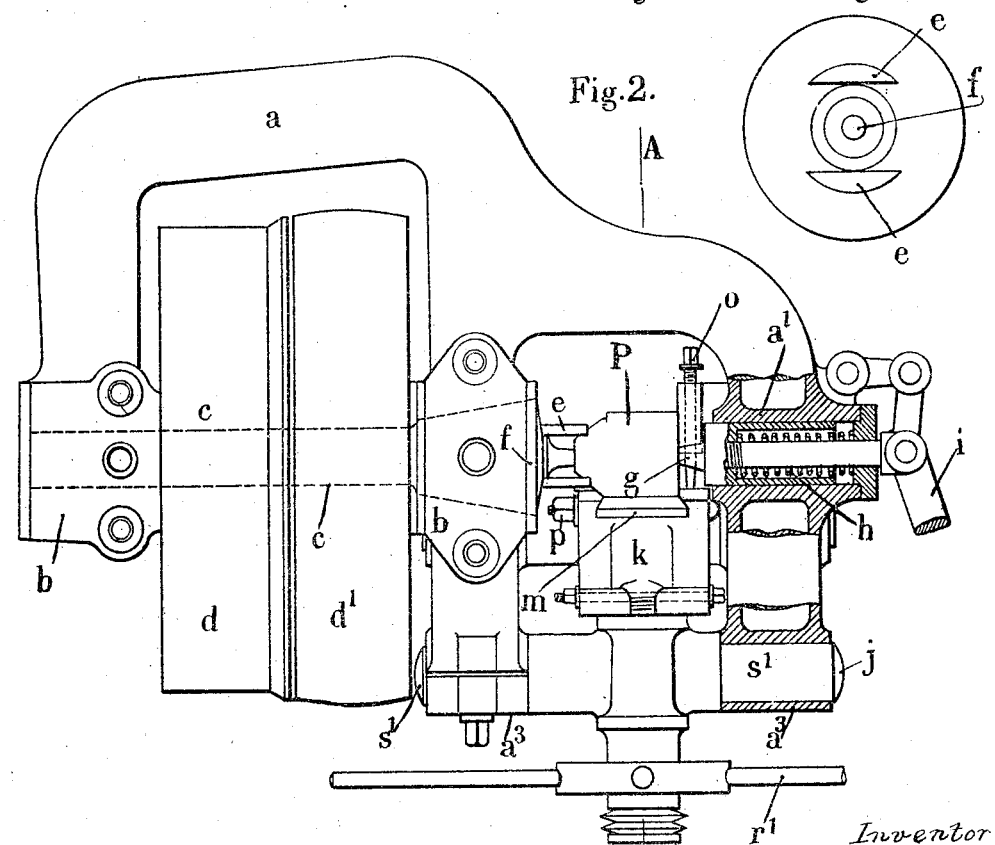
Fig. 2.
Fig. 7.
Inventor
L.C.A. Vandenheuvel
By H. R. Kerslake
Atty.

L. C. A. VANDENHEUVEL.
LATHE.
APPLICATION FILED MAR. 26, 1918.
1,287,144.
Patented Dec. 10, 1918.
2 SHEETS—SHEET 2.
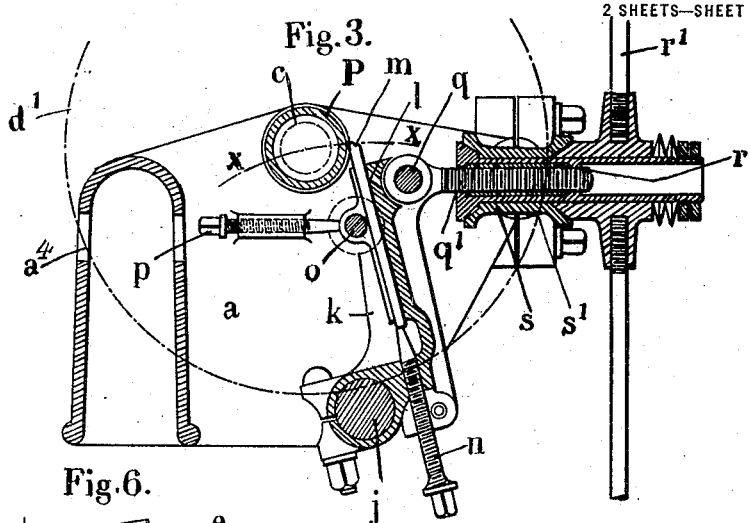
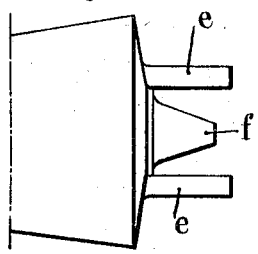
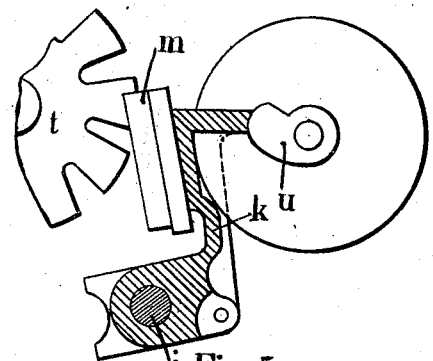
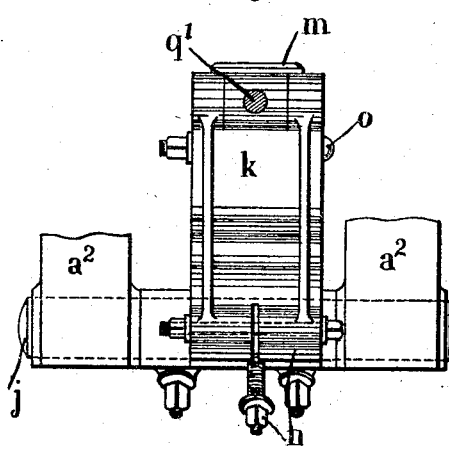
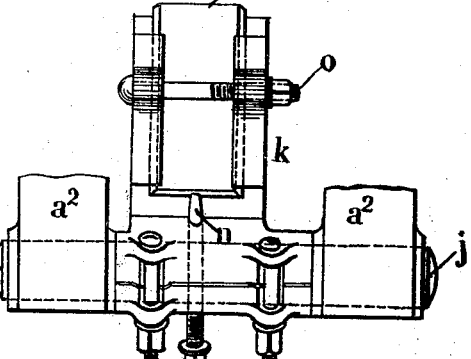
Inventor
L.C.A. Vandenheuvel
By H. R. Kerslake
Atty.

UNITED STATES PATENT OFFICE.

LOUIS CONSTANT ALBERT VANDENHEUVEL, OF NEUILLY-SUR-SEINE, FRANCE.

LATHE.

1,287,144.

Specification of Letters Patent. Patented Dec. 10, 1918.

Application filed March 26, 1918. Serial No. 224,830.

*To all whom it may concern:*

Be it known that I, LOUIS CONSTANT ALBERT VANDENHEUVEL, of 15 Avenue Philippe Le Boucher, Neuilly-sur-Seine, Seine, France, engineer, have invented Improvements in Lathes, of which the following is a full, clear, and exact description.

In lathes at present in use a great difficulty is encountered in adjusting the cutting tool so that considerable time is consumed in effecting such adjustment.

Moreover, such lathes require special care to be given to them by skilled operators.

Further, the lathes as constructed at present for carrying out several operations, generally comprise mechanical combinations which are rather complicated and are attended by the following drawbacks:

(a) A high price of manufacture of the lathe;

(b) Their manipulation is difficult and tedious on account of the combination of their elements.

For those several reasons such lathes have not a large output.

The present invention has now for its object to provide an improved lathe so designed that it can give a large output while its manipulation does not require special skill or care.

The improved lathe comprises:

1°. A special tool-holder pivoted at its lower part and adapted to receive in a dovetail groove a cutting tool, which latter is adjustable by means of a screw and is locked by means of another screw, while a stop constituted by a screw limits the travel of this device.

2°. Mechanism for operating the tool holder consisting of a screw actuated by means of a nut, said screw being pivoted on the tool holder, while the nut is mounted in a block or bearing capable of being journaled in the framing of the lathe.

3°. An apparatus for allowing of centering instantly the workpiece and holding the workpiece during the working of the lathe. This apparatus comprises a compression spring and fixed and movable centering and holding members, the movable members being operated by means of a lever.

The advantages of this improved lathe are the following:

1. The workpiece is engaged and disengaged by a simple and rapid operation requiring only the actuation of one lever.

2. The construction of the tool holder does away with all the drawbacks of ordinary tool holders, because the tool is no longer overhung in its support and therefore is not liable to chatter.

3. The feeding of the tool is effected along an arc of a circle passing through the axis of the arc of the workpiece; this feeding of the tool being effected by means of a simple and strong mechanism.

4. The operation of the lathe does not require any special knowledge, while it turns out perfect work.

5. Large output so that the first cost is very low.

6. Great simplicity of construction.

The manner in which this invention is to be performed will now be more particularly described with reference to the accompanying drawings which illustrate by way of example a practical form of this invention.

In these drawings:

Figure 1 is a side elevation of the improved lathe.

Fig. 2 is a plan partly in horizontal section.

Fig. 3 is a cross section on the line A—A of Fig. 2.

Fig. 4 is a detail showing a side view of the tool holder.

Fig. 5 is a similar view of the tool holder but taken from the opposite side.

Fig. 6 is a separate view in front elevation of the mechanism for centering and holding or driving the workpiece.

Fig. 7 is an end elevation corresponding to Fig. 6.

Fig. 8 illustrates a tool holder for backing-off milling cutters.

As shown in the drawings, the improved lathe comprises a framing $a$ provided with bearings $b$ in which is journaled a driving shaft $c$ provided with fast and loose pulleys $d$ $d^1$.

On the end of the shaft $c$ there is mounted a driver $e$ shaped to suit the workpiece; it comprises a center $f$.

Opposite this center the framing is formed with a boss $a^1$ in which is adjustably mounted a back center $g$ that is kept in constant contact with the workpiece P by the action of a very strong spring $h$.

In the drawings, the workpiece P is the body of a rifle grenade.

The instant disengagement of this back center is effected by means of a reversing lever $i$.

The framing is formed at its lower part with two bosses $a^2$ in which there is fixed a shaft $j$ upon which the tool holder $k$ is adapted to rock.

The tool holder $k$ constructed as shown more particularly in Fig. 3 of the drawings, has a dovetail groove $l$ in which the tool $m$ is fitted whose profile is formed according to the work to be done.

The adjustment of the tool $m$ is effected by means of the screw $n$, and the fixing of this tool in the groove $l$ is effected by means of the bolt $o$.

A screw $p$, serving as an adjustable stop, limits the maximum travel of the tool.

Access to this screw is had by way of apertures $a^4$ formed in the framing.

The operation of the tool holder is effected as follows:

At the upper end of the tool holder there is pivoted on a pin $q$ a screw $q^1$ working in a nut $r$ capable of turning in a bearing $s$ provided with trunnions $s^1$ journaled in two bosses $a^3$ formed on the framing of the lathe. The nut $r$ which is operated by means of the wheel arms $r^1$, imparts through the medium of the screw $q^1$ forward or backward motion to the tool holder $k$ by causing it to rock around the lower axle $j$.

The movements of the tool $m$ take place along an arc of a circle $x$ $x$ struck from the center of the shaft $j$ and passing through the center of the workpiece.

This improved lathe with a tangential cut may also serve for backing-off milling cutters of all shapes.

In the example shown, the milling cutter $t$, Fig. 8, is mounted on the lathe in place of the usual workpiece, and the tool holder $k$, provided with a suitable tool $m$, receives oscillatory motion from a cam $u$ and a suitable returning device.

It is to be understood that the shapes, details, accessories, materials and dimensions of this improved lathe with tangential cut, may vary without departing thereby in any way from the nature of the invention as set forth in the claims. For instance, the traversing slide may be operated mechanically instead of by hand. When used for backing-off, the traversing slide may be driven synchronously in dependence on the backing-off operation to be performed.

Claims:

1. In a lathe, the combination with a rotatable work piece holder, of a pivotally mounted tool holder carrying a flat cutting tool, the cutting end of the tool being movable in an arc passing through the axis of the work piece holder, a nut, means for rotating said nut, and a screw engaging said nut and pivotally connected to the tool holder.

2. In a lathe, the combination with a rotatable work piece holder, of a pivotally mounted tool holder the free end of which is movable toward and away from the axis of the work piece holder, a nut, means for rotating said nut, a screw engaging said nut and pivotally connected to the tool holder, and means for limiting the movement of the tool holder toward the axis of the work piece holder.

3. In a lathe, the combination with a rotatable work piece holder, of a pivotally mounted tool holder the free end of which is movable toward and away from the axis of the work piece holder, a nut, means for rotating said nut, a screw engaging said nut and pivotally connected to the tool holder, and an adjustable screw for limiting the movement of the tool holder toward the axis of the work piece holder.

4. In a lathe, the combination with a rotatable work piece holder, of a pivotally mounted tool holder the free end of which is movable toward and away from the axis of the work piece holder, a dove tail groove provided in the tool holder, a tool slidably mounted in the groove, a screw carried by the tool holder and bearing on the tool for moving the tool in the groove, a bolt carried by the tool holder for locking the tool in adjusted positions, and means for moving the tool holder toward and away from the axis of the work piece holder.

5. In a lathe, the combination with a rotatable work piece holder, of a pivotally mounted tool holder, a dove tail groove provided in the tool holder, a tool slidably mounted in the groove, a screw carried by the tool holder and bearing on the tool for moving the tool in the groove, a bolt carried by the tool holder for locking the tool in adjusted positions, a nut, means for rotating said nut, and a screw engaging said nut and pivotally connected to the tool holder.

The foregoing specification of my improvements in lathes, signed by me this 5th day of February, 1918.

LOUIS CONSTANT ALBERT VANDENHEUVEL.

Witnesses:
 CHAS. P. PRESSLY,
 FRANÇOIS WEBER.

Copies of this patent may be obtained for five cents each, by addressing the "Commissioner of Patents, Washington, D. C."